UNITED STATES PATENT OFFICE.

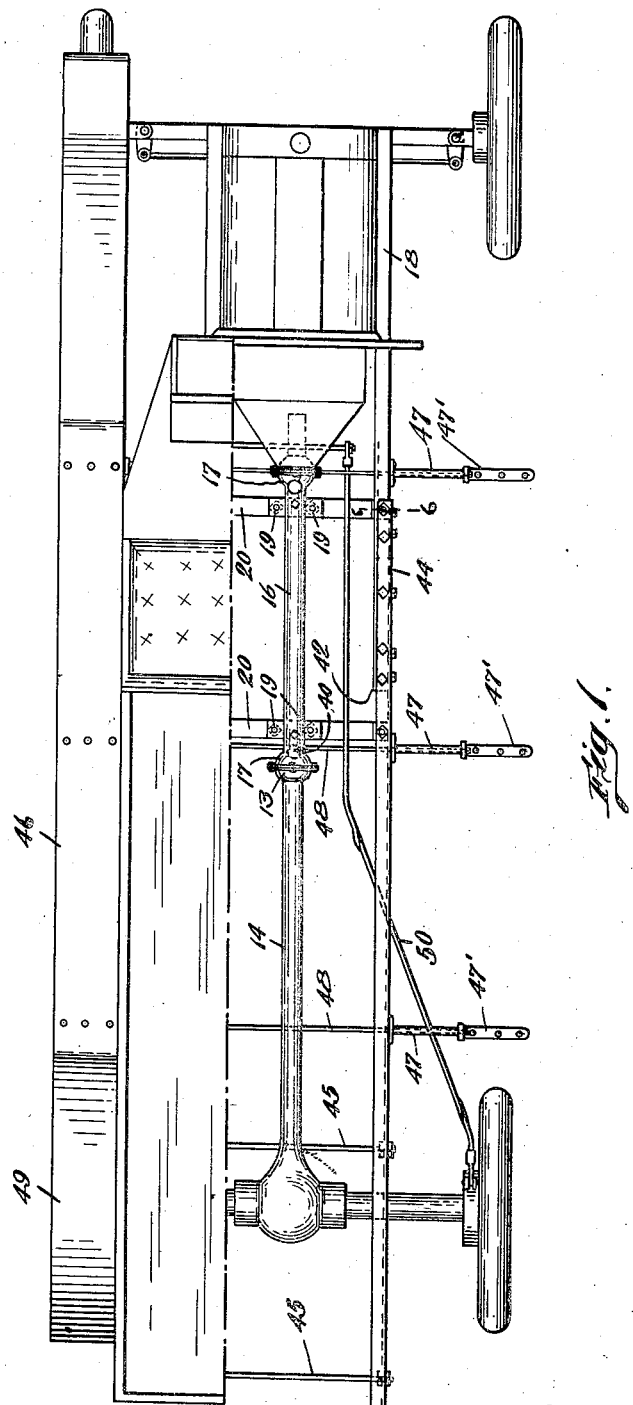

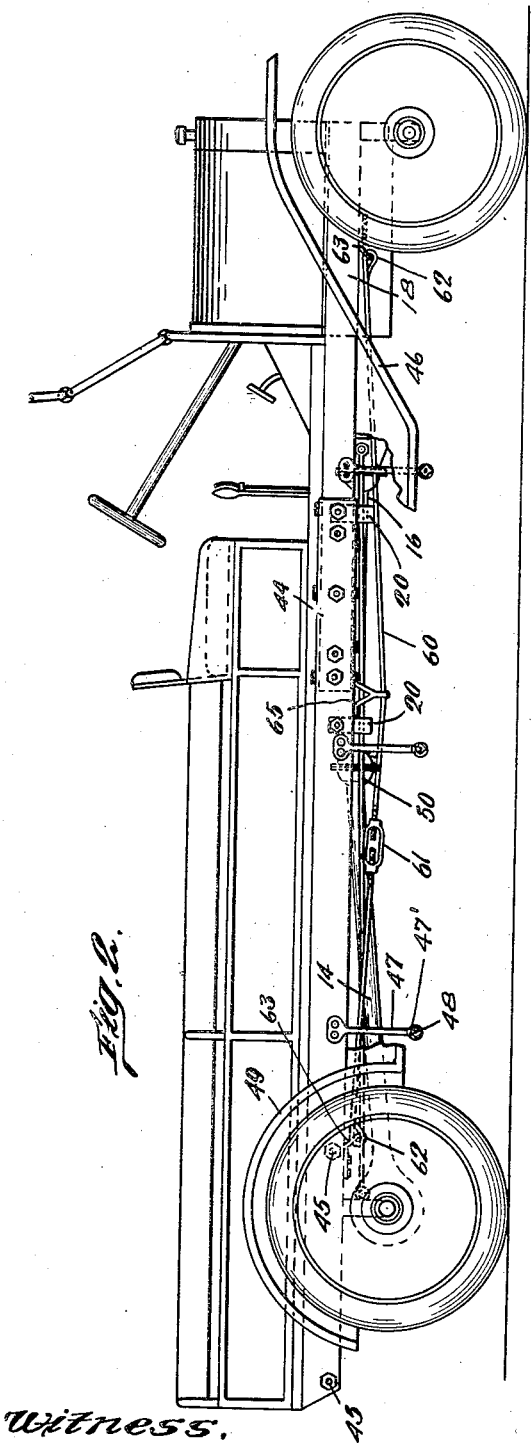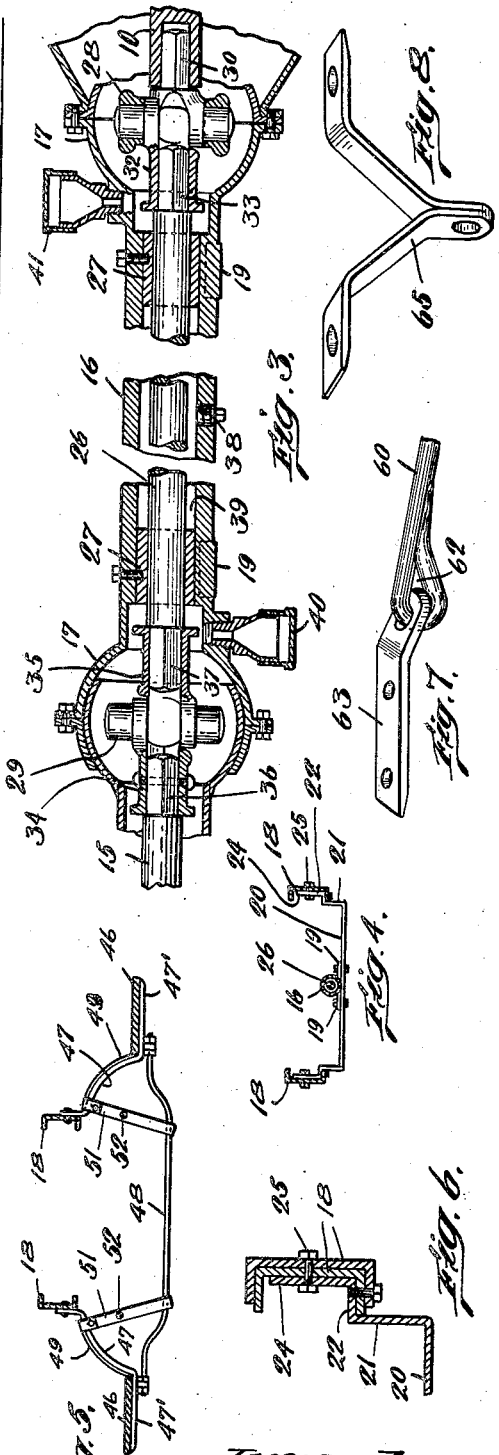

RALPH J. BEAUCHEMIN, OF LACONIA, NEW HAMPSHIRE.

MOTOR-VEHICLE.

1,305,246.        Specification of Letters Patent.        Patented June 3, 1919.

Application filed February 8, 1916. Serial No. 77,071.

*To all whom it may concern:*

Be it known that I, RALPH J. BEAUCHEMIN, a citizen of the United States, residing at Laconia, in the county of Belknap and State of New Hampshire, have invented an Improvement in Motor-Vehicles, of which the following is a specification.

This invention relates to equipment for motor vehicles, whereby the wheel-base of a vehicle of standard make may be increased in length. While my invention may be used upon any motor vehicle, where greater carrying capacity is required, I shall, for the purposes of this application, restrict my description to that instance where it is desired to convert an ordinary pleasure car of standard construction into a motor truck having a wheel-base longer than that of the pleasure car. The lengthening of the wheel-base involves something more than merely lengthening the frame, running boards, etc., correspondingly, and presents a serious problem as regards the transmission of power from the motor, the position of which cannot, of course, be changed to accord with the increased wheel-base. Merely substituting a longer drive-shaft is not, of itself, sufficient, owing to the limitations which exist as regards the efficient transmission of power through a single shaft in excess of a predetermined length. Moreover, such substitute shaft would not, of itself, take care of the torque and unless the driving-mechanism was reorganized to provide the requisite flexibility, this expedient would not be satisfactory. Furthermore, should the increased wheel-base be intended only as a temporary expedient, as is frequently the case, the change back to the normal wheel-base would involve the replacement of the original drive-shaft and associated parts, which is not always convenient or practicable. Any construction, therefore, which involves a substantial reorganization of the driving-mechanism or the changing of those parts which have come to be practically standard on nearly every automobile, in order to meet the new conditions imposed, is objectionable, as both expensive and inexpedient.

The present invention provides equipment by means of which the wheel-base may be lengthened as desired, without involving a substantial reorganization of parts and without loss of efficiency of drive. In the embodiment shown in the accompanying drawing, Figure 1 is a plan view of a motor truck embodying my invention, part of the body being removed to expose details.

Fig. 2 is a side elevation thereof.

Fig. 3 is an enlarged central longitudinal section through the extension shaft, which is flexibly interposed between the transmission shaft and the drive shaft of the vehicle.

Fig. 4 is a transverse section through the frame of the car, illustrating particularly the support and bearing for the interposed extension shaft.

Fig. 5 is a view similar to Fig. 4, particularly illustrating a support for the running boards and brake-rods.

Fig. 6 is an enlarged detail section on the dotted line 6—6 of Fig. 1, illustrating the connection at the overlapping ends of the side-bars of the vehicle frame.

Fig. 7 is a detail of the attaching-means for one end of the truss-bar, and,

Fig. 8, is a detail view of an intermediate strut for the truss-bar.

10, see Fig. 3, indicates an end-portion of the transmission-shaft which, as here shown, is inclosed in a suitable housing 11, arranged in the transmission case 11$^a$, and provided at one end with a flanged cup-shaped portion 12, arranged, when the car is used with its normal wheel-base to be detachably connected with the similarly-formed end-portion 13 of a housing 14 for the drive-shaft 15, whereby to provide therewith a substantially hollow spherical casing for the usual universal joint which is interposed between the said shafts in such use. When the wheel-base is increased in length, the flanged cup-shaped portions 12 and 13 are detached and a housing 16 having a similarly formed cup-shaped portion 17 at each end, is interposed between, and detachably connected to the portions 12 and 13, as shown in Fig. 1. The housing 16 is supported by the channeled side-bars 18 of the frame by means of integrally-formed lugs 19 (see Fig. 4), which are secured to a pair of spaced supporting bars 20, extending transversely of the car and secured to said side-bars. Each bar 20 extends between the side-bars as a transverse supporting-member and is bent upwardly at its ends, as at 21, and then over the lower edge of the channeled side of the bar 18, as at 22, being secured thereto by bolts 23, or other means, and then upward as at 24, contiguous to the web portion of the channel and secured thereto by bolts 25, or other means.

The transmission-shaft 10 and the drive-shaft 15 are operatively connected by an extension-shaft 26, mounted in suitable bearings 27, made as bushings and arranged within and near each end of the housing 16. In order to provide the necessary flexibility between the shafts 10 and 15 and the member 26, I interpose between said parts a pair of universal joints, indicated at 28 and 29, Fig. 3, and housed by the casings formed by the portions 12 and 17 and 13 and 17. The universal joint 28 between the transmission-shaft and the forward end of the extension-shaft 26 is standard, having a male end 30 to receive the female end of the transmission-shaft and a female end 32 to receive the male end 33 of the extension-shaft 26. The universal joint 29 between the drive-shaft and the rear-end of the extension-shaft 26 is special, having both ends of female formation, as at 34 and 35 to receive, respectively, the male end 36 of the drive-shaft 15 and the male end 37 of the extension-shaft 26.

Lubricant is introduced to the extension-shaft 26 by means of a screw plug 38, let through the housing 16 between the bearings 27 for said member, said bearings and the inside face of the housing forming a grease or oil pocket or chamber 39 around the central part of the extension-shaft. The universal joints 28 and 29 are supplied with lubricant from grease cups 40 and 41 arranged at each end of the housing 16, and preferably at opposite sides thereof.

The lengthening of the wheel-base involves, a corresponding lengthening of the chassis, running boards, brake-rods, etc., of the car. The side-bars 18, each comprise two channeled members, overlapping one another at their inner ends, as for instance, along the space about midway between the front and rear wheels. The front end-portions of these side-bars may be the corresponding portions of the standard side-bars, having the rear end-portions thereof cut off at 42, and as a substitute for the rear end-portions so cut off, new rear end-portions of longer structure are provided to give the increased length, and also to form the lap. The lapped portions are indicated at 44. By increasing the length of the side-bars in this manner they are very strong so that a great weight may be sustained upon the rear end-portion of the truck, whereas, if said side-bars were lengthened by merely adding short lengths to their rear ends, such great weight could not be sustained. Therefore, it is a great advantage to have the increased length at the middle or at a substantial distance in front of the rear axle.

One of the straps 20 is attached to the lapped portions of the side-bars and the other to the rear end-portions of said bars. The lengthened frame will be braced transversely by the transverse tie rods 45, Fig. 1, which form a new element in the structure.

The running-boards 46 are supported upon the laterally extended arms 47' of a plurality of hangers 47, depending from the side-bars of the chassis and braced transversely in any suitable manner, as by the transversely extending tie-rods 48, Fig. 5. The hangers 47 are preferably bowed outwardly between their ends to provide supports for the splash guards 49.

The brake-rods 50 are supported near the rear axle by angularly related members 51, fastened to the rearmost pair of hangers 47, at their upper ends, and to the tie-rod 48, at their lower ends, said members also serving to brace said pair of hangers. The brace-members 51 are provided with holes 52, Fig. 5, through which the brake-rods extend.

In view of the fact that the construction employed is of light weight, the side-bars 18 of the frame are additionally strengthened by truss-bars arranged beneath them and attached at their ends thereto, and herein 60 represents one of the truss-bars which is composed of two parts joined together in an adjustable manner by a turn buckle 61, and the ends of said bar are formed with eyes 62, and attaching-irons 63 are provided which are attached to the underside of the side-bar, near the extremities thereof, said attaching-irons having eyes to loosely or pivotally receive the eye-formed ends of the truss-bar. Along the middle of the truss-bar a strut 65 is provided which is here shown as a bracket of Y formation, which is attached at its upper end to the side bar, and has its lower end formed with a transverse hole through it, through which the truss-bar freely extends.

From the foregoing, it is believed that the construction and manner of assembling my invention will be apparent without further description. It will be understood that many of the structural features here shown for the sake of illustration may be changed without departing from the spirit and scope of my invention.

I claim:—

1. In a motor vehicle, the combination with the transmission-shaft and drive-shaft, and housings therefor, said shafts and said housings being spaced apart, of an extension-shaft interposed between said shafts and flexibly connected at its ends to said shafts by universal joints, a housing for said extension-shaft having cup-shaped end-portions, which is interposed between the aforesaid housings and adapted to be connected therewith, said interposed housing having bearings arranged within it for the extension-shaft, and having a hole arranged between said bearings with closure therefor.

2. In a motor vehicle, the combination with the transmission-shaft and drive-shaft, and housings therefor, said shafts and said housings being spaced apart, of an extension-shaft interposed between said shafts and flexibly connected at its ends to said shafts by universal joints, a housing for said extension-shaft having cup-shaped end-portions, which is interposed between the aforesaid housings and adapted to be connected therewith, said interposed housing having internal bearings for the extension-shaft, and having external lugs extended in opposite ways, and transverse supporting-bars connected with the frame and spaced apart and adapted to receive upon them the lugs of the interposed housing.

3. In a motor vehicle, the combination with the transmission-shaft and drive-shaft, and housings therefor, said shafts and said housings being spaced apart, of an extension-shaft interposed between said shafts and flexibly connected at its ends to said shafts by universal joints, a housing for said extension-shaft having integral cup-shaped end-portions, which is interposed between the aforesaid housings and adapted to be connected therewith, said interposed housing having laterally extended integral lugs and transverse supporting-bars connected with the frame and adapted to receive the lugs of said interposed housing.

4. In a motor vehicle, the combination of a transmission-shaft, having a female end, and a drive-shaft having a male-end, said shafts being spaced apart, housings for said shafts having casing-forming portions at their opposed ends, a housing interposed between the aforesaid housings and having casing-forming portions arranged for detachable engagement with the casing-forming portions of the housings and providing therewith casings, an extension-shaft rotatably mounted in said interposed housing and having both ends of male formation, and a pair of universal joints in said casings and operatively connecting the ends of said extension-shaft, respectively, with said transmission-shaft and drive-shaft, one of said universal joints having a male and a female end to fit, respectively, the female end of the transmission-shaft and the male end of the extension-shaft, and the other universal joint having both ends of female formation to receive the other male end of the extension-shaft and the male end of the drive-shaft.

5. In a motor vehicle, the combination of a transmission-shaft having a female end, and a drive-shaft having a male end, said shafts being spaced apart, an extension-shaft having both ends of male formation and interposed between said shafts, and a universal joint at each end of said extension-shaft and operatively connecting said shaft with said transmission-shaft and drive-shaft, one of said universal joints having a male and a female end to fit, respectively, the female end of the transmission-shaft and the male end of the extension-shaft, and the other universal joint having both ends of female formation to receive the other male end of the extension-shaft and the male end of the drive-shaft.

6. In a motor vehicle, the combination with the channeled side-bars of the frame, of a transversely disposed supporting-member, a housing having a pair of oppositely extended lugs thereon fastened to said supporting-member, an extension-shaft arranged in said housing, and a pair of spaced shafts operatively connected to each other by said extension-shaft.

7. In a motor vehicle, the combination with the channeled side-bars of the frame, of a transversely disposed supporting-member having its ends bent vertically, then horizontally, and then vertically to conform to said bars, fastenings disposed at substantially right angles to each other to secure said supporting-members to said bars, a housing secured to said supporting-member, an extension-shaft arranged in said housing, and a transmission-shaft and drive-shaft operatively connected to said extension-shaft.

8. The drive-shaft mechanism of an automobile, comprising a drive-shaft, a housing therefor extended forwardly from the rear axle to intermediate the length of the wheel-base, a universal-joint, one member of which is connected to the forward extremity of said drive-shaft, and the forward extremity of the other member has a socket, an extension shaft-member, the rear end of which is arranged in the socket of said universal joint member, a motor-driven member having a socket adapted to receive the forward end of said extension shaft, and an intermediate support for said mechanism connected with the wheel-base.

9. The drive-shaft mechanism of an automobile, comprising a drive-shaft, a housing therefor extended forwardly from the rear axle to intermediate the length of the wheel-base, an extension shaft-member, a universal joint connecting said drive-shaft and extension shaft-member and arranged in the end of the housing of said drive shaft, and intermediate supporting means for holding the extension-shaft in horizontal position, and the drive-shaft angularly related thereto.

10. The drive-shaft mechanism of an automobile comprising a drive-shaft, a housing therefor extended forwardly from the rear axle and terminating in a globular enlargement intermediate the length of the wheel-base, a universal joint arranged in said enlargement, one member of which is connected to the forward extremity of said drive-shaft, and the forward extremity of the other member has engaging means, an extension-shaft member the rear end of which is adapted for engagement with said engaging means, a motor-driven member having a socket adapted to receive the forward end of said extension shaft, and an intermediate support for said mechanism connected with the frame of said automobile.

11. In a motor vehicle, a frame comprising longitudinal and transverse-bars secured together, and truss-bars arranged beneath the longitudinal-bars and extended substantially from end to end thereof, said bars having eyes at their ends and attaching-arms adapted to be attached to the side-bars having perforated offset end-portions to receive the ends of the truss-bars, and intermediate struts for said bars.

12. In a motor vehicle, a frame comprising longitudinal and transverse-bars secured together, and truss-bars arranged beneath the longitudinal-bars and extended substantially from end to end thereof, and loosely connected at their ends to said bars, and an intermediate strut for each truss-bar consisting of a bracket having a transverse hole through it through which the truss-bar extends.

13. In a motor vehicle, a frame comprising longitudinal and transverse-bars secured together, and truss-bars arranged beneath the longitudinal-bars and extended substantially from end to end thereof, and loosely connected at their ends to said bars, and an intermediate strut for each truss-bar consisting of a Y-formed bracket adapted to be attached to the frame, and having a transverse hole through it for the truss-bar.

14. In a motor vehicle, the combination with the running board, hangers depending from the side-bars of the frame, and brace-members bracing said hangers from below, and supports for the brake-rods connected to the hangers and brace-members.

In testimony whereof I have signed my name to this specification in the presence of two subscribing witnesses.

RALPH J. BEAUCHEMIN.

Witnesses:
HARRY MACE,
STANTON OWEN.